US008195891B2

(12) United States Patent
Trika

(10) Patent No.: US 8,195,891 B2
(45) Date of Patent: Jun. 5, 2012

(54) TECHNIQUES TO PERFORM POWER FAIL-SAFE CACHING WITHOUT ATOMIC METADATA

(75) Inventor: Sanjeev N. Trika, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 568 days.

(21) Appl. No.: 12/414,385

(22) Filed: Mar. 30, 2009

(65) Prior Publication Data
US 2010/0250833 A1    Sep. 30, 2010

(51) Int. Cl.
G06F 12/08    (2006.01)
(52) U.S. Cl. . 711/144; 711/135; 711/145; 711/E12.042; 711/E12.052; 711/E12.003
(58) Field of Classification Search .................. 711/118, 711/141, 144, 145, E12.003, 135, E12.042, 711/E12.052
See application file for complete search history.

(56) References Cited

U.S. PATENT DOCUMENTS

| 5,025,365 A * | 6/1991 | Mathur et al. ................ 711/144 |
| 5,269,019 A | 12/1993 | Peterson et al. |
| 6,219,693 B1 * | 4/2001 | Napolitano et al. .......... 709/203 |
| 2002/0078244 A1 * | 6/2002 | Howard ........................ 709/248 |
| 2003/0120868 A1 | 6/2003 | Royer, Jr. et al. |
| 2004/0210706 A1 * | 10/2004 | In et al. ........................ 711/203 |
| 2005/0177687 A1 | 8/2005 | Rao |
| 2006/0294300 A1 * | 12/2006 | Lubbers ....................... 711/113 |
| 2008/0250199 A1 * | 10/2008 | Lubbers ....................... 711/113 |

FOREIGN PATENT DOCUMENTS

WO    WO 2010/030715    3/2010

OTHER PUBLICATIONS

Combined Search and Examination Report for United Kingdom Patent Application No. GB1005303.1 mailed Jul. 15, 2010, 8 pages.
Office Action for German Application No. 10 2010 013 263.2-53, Mailed Nov. 5, 2010, 6 pages.
U.S. Appl. No. 11/229,128, filed Mar. 15, 2007, Faber, Robert W.
U.S. Appl. No. 11/172,608, filed Jan. 4, 2007, Trika, Sanjeev N.
Windows PC Accelerators, Nov. 30, 2006, 16 pages, Microsoft Corporation.
Amber Huffman, Non-Volatile Memory Host Controller Interface (NVMHCI) 1.0, Apr. 14, 2008, 65 pages, Intel Corporation.
Combined Search and Examination Report for Great Britain Patent Application No. GB1005303.1, Mailed Jun. 24, 2011, 5 pages.

* cited by examiner

Primary Examiner — Pierre-Michel Bataille
(74) Attorney, Agent, or Firm — Blakely, Sokoloff, Taylor & Zafman LLP

(57) ABSTRACT

A method and system to allow power fail-safe write-back or write-through caching of data in a persistent storage device into one or more cache lines of a caching device. No metadata associated with any of the cache lines is written atomically into the caching device when the data in the storage device is cached. As such, specialized cache hardware to allow atomic writing of metadata during the caching of data is not required.

29 Claims, 9 Drawing Sheets

// Volatile structures to maintain
SPARES = List of cache lines that do not hold data
LBA2CL = Cache Table. Maps LBA to a cache line. LBA2CL[x] is the cache line that holds the data for LBA x, or is -1 otherwise.
META = contains metadata for all the cache lines. META[cl] is the metadata corresponding to cache line cl. META[cl] contains the LBA number of the cached HDD sector, and may contain other information.
PENDING_META_WRITES = list of cache lines numbers for which the metadata has not been written non-volatilely.

// Layout of the data on the non-volatile media
NV_META = Non-volatile metadata. NV_META[cl] contains metadata for cachline cl.
NV_CACHE = Cache data. NV_CACHE[cl] contains the user data stored in cacheline cl.

// InitializeNvStructures (Done only when cache is initialized or reset)
For cl = 0 to (NumCachelines – 1)
    nvmeta[cl].LBA = -1
End for
Write nvmeta to NV_META // InitializeVolatileStructures
// Initializes the volatile structures from the information stored non-volatilely.
// Done on every startup (proper or improper)
SPARES = {}
PENDING_META_WRITES = {}
Read nvmeta from NV_META
For cl = 0 to NumCachelines – 1
    lba = nvmeta[cl].lba
    META[cl] = nvmeta[cl]
    If (lba >= 0)
        LBA2CL[lba] = cl;
    Else
        SPARES = SPARES union { cl }
    End if
End for // ProperShutdown
CacheFlush

FIG. 8A

```
// Insert (LBA L, Data D, Metadata M)
// Inserts the specified data and metadata into the cache.
// The metadata remains volatile until a subsequent flush completes.
If SPARES is empty then
        lbaList = PickLBAsToEvict ()      // runs the cache's eviction policy.
        Evict(lbaList)                    // may call this multiple times to evict multiple
                                          // cachelines.This adds an element to
                                          // SPARES.
Endif cl = SPARES.RemoveElement ()
Write D to NV_CACHE[cl]
PENDING_META_WRITES = PENDING_META_WRITES union { (cl,L) }
META[cl] = M
LBA2CL[L] = cl // Evict (lbaList)
// Removes the specified cachelines from the cache.
For each L in lbaList
        cl = LBA2CL[L]
        Clean the cacheline cl if its dirty (i.e., if not clean, read data from cache and
write to disk).
        META[cl] = zeroes
        LBA2CL[L] = -1
        SPARES = SPARES union { cl }
        PENDING_META_WRITES = PENDING_META_WRITES union { (cl,L) }
End for UpdateNvMetadata ()

// ReadFromCache (LBA L)
// Reads data from the cache, or returns an error if it's a miss
cl = LBA2CL[L]
if (cl < 0)
        return NOT_IN_CACHE
end if
Read SSD data from NV_CACHE[cl], and return it.

// CacheFlush
// Ensures that all data and metadata in the cache is non-volatile
UpdateNvMetadata ()
Issue Flush to the SSD // UpdateNvMeta
// Writes any pending metadata writes to the cache
For each cl in PENDING_META_WRITES
        X = SSD sector that contains NV_META[cl]
        Update SSD sector X with information in META[cl]
End for
```

TECHNIQUES TO PERFORM POWER FAIL-SAFE CACHING WITHOUT ATOMIC METADATA

FIELD OF THE INVENTION

This invention relates to caching, and more specifically but not exclusively, to power fail-safe write-back or write-through caching in a non-volatile media.

BACKGROUND DESCRIPTION

The storage subsystem is one of the slowest subsystems of a computer system, especially when the storage subsystem utilizes a storage medium such as a hard-disk drive (HDD). A HDD requires relatively long access time as the read/write heads need to be moved mechanically to a particular location on the platters of the HDD in order to read/write data.

To improve the performance of the HDD, a non-volatile cache memory can be used to hold the results of recent reads from the HDD and writes to the HDD. By caching the data of the HDD, the performance of the computer system can be increased, and the HDD can remain spun down for longer durations to reduce power consumption of the computer system.

However, if the power to the computer system is unexpectedly shut off, the data in the non-volatile cache memory must be associated back with the HDD in order to prevent data corruption. Dedicated caching hardware that supports atomic metadata writes with the cache data writes can be utilized to ensure that this recovery is done correctly, but it increases the cost of the computer system.

BRIEF DESCRIPTION OF THE DRAWINGS

The features and advantages of embodiments of the invention will become apparent from the following detailed description of the subject matter in which:

FIGS. 8A and 8B illustrate a pseudo code to implement a write-back caching scheme in accordance with one embodiment of the invention.

DETAILED DESCRIPTION

Figure 1:
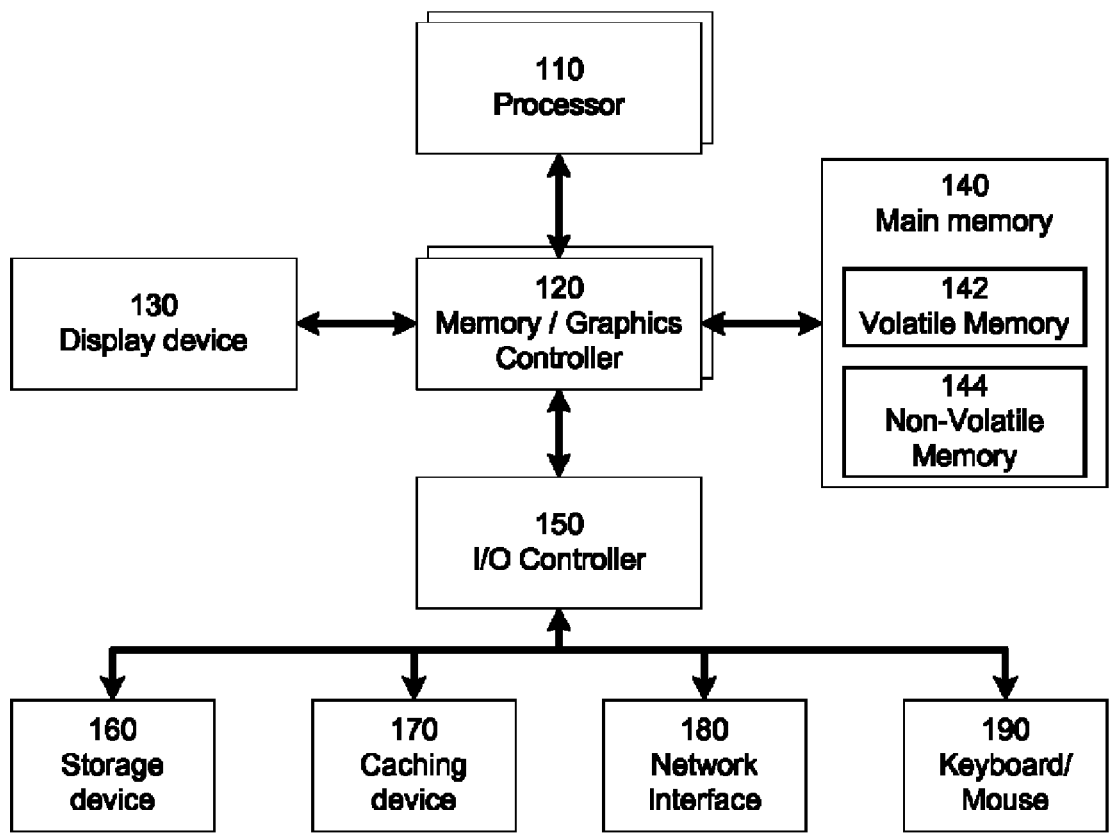
FIG. 1 illustrates a system to implement the methods disclosed herein in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system to allow power fail-safe write-back or write-through caching of data in a persistent storage device into one or more cache lines of a caching device that does not require atomic metadata. No metadata associated with any of the cache lines is written atomically into the caching device when the data in the storage device is cached. As such, specialized cache hardware to allow atomic writing of metadata during the caching of data is not required.

In one embodiment of the invention, the metadata associated with the cache lines includes, but is not limited to, the location of the data on the cached storage device such as the logical block address (LBA) of the data, the sequence number, the state of the cache line such as whether the data is clean or dirty, the pinning information of the cached LBAs of the storage device and the like. The storage device includes, but is not limited to, a solid state drive (SSD), a HDD, a Redundant Array of Independent Disks (RAID) volume, a tape drive, a compact disk (CD), a floppy disk, an universal serial bus (USB) flash memory drive, or any other form of non-volatile or persistent computer data storage medium. The caching device includes, but is not limited to, a non-volatile medium, a SSD, NAND flash memory, phase change memory or any other form of non-volatile or persistent computer data storage medium.

FIG. 1 illustrates a system 100 to implement the methods disclosed herein in accordance with one embodiment of the invention. The system 100 includes but is not limited to, a desktop computer, a laptop computer, a notebook computer, a netbook computer, a personal digital assistant (PDA), a server, a workstation, a cellular telephone, a mobile computing device, an Internet appliance or any other type of computing device. In another embodiment, the system 100 used to implement the methods disclosed herein may be a system on a chip (SOC) system.

The system 100 includes a memory/graphics controller 120 and an I/O controller 150. The memory/graphics controller 120 typically provides memory and I/O management functions, as well as a plurality of general purpose and/or special purpose registers, timers, etc. that are accessible or used by the processor 110. The processor 110 may be implemented using one or more processors or implemented using multi-core processors. The I/O controller 150 allows power fail-safe write-back or write-through caching of data in the storage device 160 into one or more cache lines of the caching device 170 or the non-volatile memory 144 in accordance with one embodiment of the invention.

The memory/graphics controller 120 performs functions that enable the processor 110 to access and communicate with a main memory 140 that includes a volatile memory 142 and/or a non-volatile memory 144. In another embodiment of the invention, another volatile memory 142 (not shown in FIG. 1) is embedded in the storage device 160 to cache the data of the storage device 160. The memory/graphics controller 120 may, in place of the I/O controller 150, allow power fail-safe write-back or write-through caching of data in the storage device 160 into the one or more cache lines of the caching device 170 in accordance with another embodiment of the invention.

The volatile memory 142 includes, but is not limited to, Synchronous Dynamic Random Access Memory (SDRAM), Dynamic Random Access Memory (DRAM), RAMBUS DRAM (RDRAM), and/or any other type of random access memory device. The non-volatile memory 144 includes, but is not limited to, NAND flash memory, Read Only Memory (ROM), Electrically Erasable Programmable ROM (EEPROM), and/or any other desired type of memory device. The main memory 140 stores information and instructions to be executed by the processor 110. The main memory 140 may also store temporary variables or other intermediate information while the processor 110 is executing instructions. In another embodiment of the invention, the memory/graphics controller 120 is part of the processor 110.

The memory/graphics controller 120 is connected to a display device 130 that includes, but not limited to, liquid crystal displays (LCDs), cathode ray tube (CRT) displays, or any other form of visual display device. The I/O controller 150 is coupled with, but is not limited to, a storage device(s) 160, a caching device(s) 170, a network interface 180, and a keyboard/mouse 190. In particular, the I/O controller 150 performs functions that enable the processor 110 to communicate with the storage device 160, the caching device 170, the network interface 180, and the keyboard/mouse 190. In one embodiment, the caching device 170 could be part of the storage device 160.

The network interface 180 is implemented using any type of well-known network interface standard including, but not limited to, an Ethernet interface, an USB interface, a Peripheral Component Interconnect (PCI) Express interface, a wireless interface and/or any other suitable type of interface. The wireless interface operates in accordance with, but is not limited to, the Institute of Electrical and Electronics Engineers (IEEE) wireless standard family 802.11, Home Plug AV (HPAV), Ultra Wide Band (UWB), Bluetooth, WiMax, or any other form of wireless communication protocol.

In one embodiment of the invention, the bus(es) shown in FIG. 1 is a communication link shared by all components connected to it. In another embodiment of the invention, the bus(es) shown in FIG. 1 is a point-to-point communication link between pairs of components connected each other. While the components shown in FIG. 1 are depicted as separate blocks within the system 100, the functions performed by some of these blocks may be integrated within a single semiconductor circuit or may be implemented using two or more separate integrated circuits. For example, although the memory/graphics controller 120 and the I/O controller 150 are depicted as separate blocks, one of ordinary skill in the relevant art will readily appreciate that the memory/graphics controller 120 and the I/O controller 150 may be integrated within a single semiconductor circuit.

Figure 2:
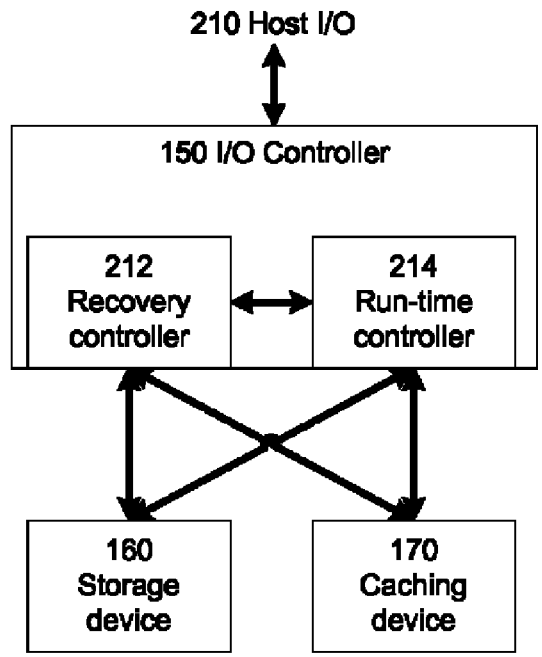
FIG. 2 illustrates a block diagram of an I/O controller in accordance with one embodiment of the invention.

FIG. 2 illustrates a block diagram 200 of an I/O controller 150 in accordance with one embodiment of the invention. The I/O controller 150 has a recovery controller 212 and a run-time controller 214. In one embodiment of the invention, the run-time controller 214 has a caching policy based on heuristics to determine if the data of the storage device 160 is to be cached or evicted from the caching device 170. The heuristics include, but are not limited to, most recently accessed LBAs, pinning information of the LBAs and the like. The run-time controller 214 also performs caching mechanisms such as the detection of cache hits or cache misses and the queuing of caching or eviction commands in one embodiment of the invention.

The run-time controller 214 utilizes the full data capacity of the caching device 170 to cache the data of the storage device 160 in one embodiment of the invention. In another embodiment of the invention, the run-time controller 214 utilizes a portion of the full data capacity of the caching device 170 to cache the data of the storage device 160. For example, in one embodiment of the invention, the run-time controller 214 utilizes half of the full data capacity of the caching device 170 to cache the data of the storage device 160 and utilizes the other half of the full data capacity of the caching device 170 as a storage medium.

The recovery controller 212 and the run-time controller 214 allow power fail-safe write-back or write-through caching of the data in the storage device 160 into the caching device 170 in one embodiment of the invention. One of ordinary skill in the relevant art will readily appreciate that other caching schemes may also be used without affecting the workings of the invention. In the event of a failure of the system 100, the recovery controller 212 and the run-time controller 214 preserves the integrity or coherency of the data in the storage device 160 and the cached data in the caching device 170 in one embodiment of the invention. The failure event of the system 100 includes, but is not limited to, power loss failure, operating system (OS) crash failure, improper shutdown of the system 100 and other events that are not within the normal operating conditions of the system 100.

The recovery controller 212 recovers the cache state of the cache lines in the caching device 170 after a failure event has occurred in one embodiment of the invention. In other embodiments of the invention, the recovery controller 212 handles other events including, but not limited to, separation detection and handling, handling of all I/O data prior to the initialization of the run-time controller 214 and the like. Although the recovery controller 212 and the run-time controller 214 are depicted as part of the I/O controller 150 in FIG. 2, it is not meant to be limiting. The recovery controller 212 and the run-time controller 214 can implemented together in the same hardware or software module or they can be implemented separately in different hardware or software modules.

In one embodiment of the invention, the recovery controller 212 and the run-time controller 214 are part of the memory/graphics controller 120. The recovery controller 212 and the run-time controller 214 can also be merged as a single controller in another embodiment of the invention. One of ordinary skill in the relevant art will readily appreciate that different configurations of the recovery controller 212 and the run-time controller 214 can be implemented without affecting the workings of the invention. For example, in one embodiment of the invention, the recovery controller 212 is implemented as a firmware stored in an option ROM of the system 100 and the run-time controller 214 is implemented in a block storage driver of an OS executing on the system 100.

Figure 3:
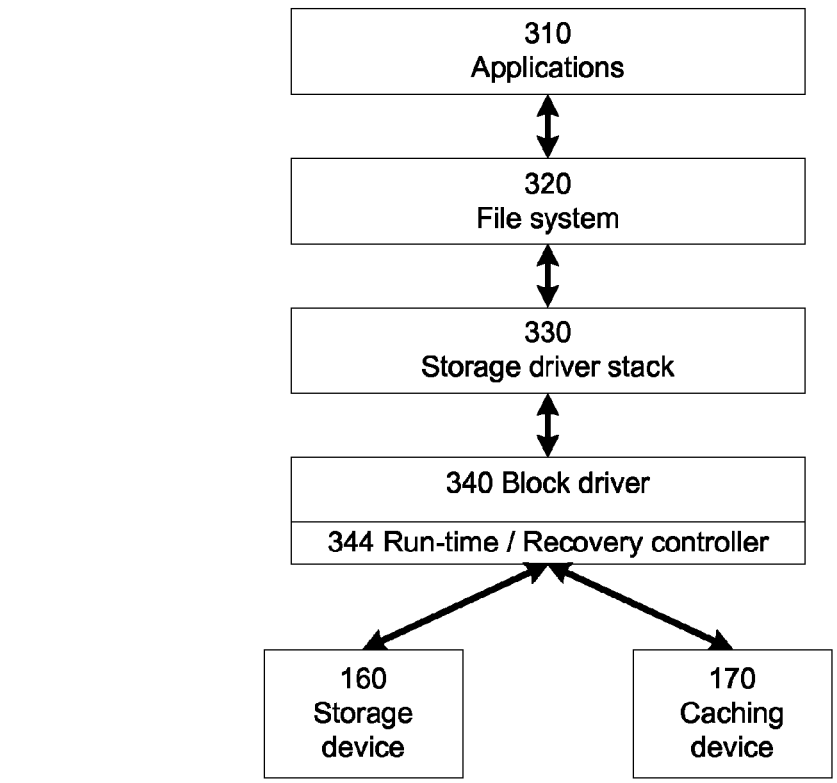
FIG. 3 illustrates a block diagram of the modules in an operating system in accordance with one embodiment of the invention.

FIG. 3 illustrates a block diagram 300 of the modules in an OS in accordance with one embodiment of the invention. The OS has an applications layer 310 and a file system 320. The applications layer 310 is able to access files organized by the file system 320. The OS also has a storage driver stack 330 and a block driver 340. The block driver 340 has a run-time/recovery controller 344 in accordance with one embodiment of the invention. The block driver 340 may include the run-time controller, the recovery controller, or both the run-time and recovery controller.

The run-time/recovery controller 344 is coupled with the storage device 160 and the caching device 170 and it caches the data in the storage device 160 into the caching device 170. No state information or metadata associated with any of the cache lines of the caching device 170 is stored in the caching device 170 atomically during the caching of the data in the storage device 160. In one embodiment of the invention, the OS utilizes a write-back caching scheme, where any data to be written to the storage device 160 is first written to the caching device 170. The OS does not write the data to the storage device 160 immediately after writing to the caching device 170 but waits for an appropriate time to write the data to the storage device. As such, the data access of the storage device 160 is minimized and the OS does not need to wait for the data to be written to the storage device 160 before executing other instructions. The write-back caching scheme is beneficial to speed up the storage subsystem of the system 100 as the data access rate of the caching device 170 is faster than the data access rate of the storage device 160.

The data in the storage device 160 may not be synchronous with the cached data in the caching device 170 when write-back caching scheme is utilized. In one embodiment of the invention, the run-time/recovery controller 344 synchronizes the cached data in the caching device 170 with the data in the storage device 160 when the utilization rate of the processor 110, storage device 160, or caching device 170 of the system 100 are under utilized. For example, in one embodiment of invention, the run-time/recovery controller 344 determines that the utilization rate of the processor 110 in the system 100 is below a threshold and synchronizes the cached data in the caching device 170 that has not been synchronized with the data in the storage device 160. One of ordinary skill in the relevant art will readily appreciate that other schemes or policies may be utilized to perform background synchronization of the data in the caching device 170 without affecting the workings of the invention.

The OS may issue a periodic flush command to the I/O Controller 150 to ensure that all previously written data is non-volatile. In one embodiment of the invention, the I/O Controller 150 guarantees that both the data and the metadata updates are non-volatile in the storage device 160 and the caching device 170 when a flush command is completed, and that all previously written data can be recovered even if an improper shutdown such as a power failure of the system 100 occurs.

In another embodiment of the invention, the OS utilizes a write-through caching scheme, where the data in the storage device 160 and the cached data in the caching device 170 are always synchronous. When the OS performs a write operation, both the caching device 170 and the storage device 160 are written with the same data.

Embodiments of the invention allow the reduction in development cost of the system 100 as no specialized caching hardware is required to enable power fail-safe write-through and write-back caching. For example, in one embodiment of the invention, a relatively small-sized SSD is used to cache one or more large-sized hard disk drives without the need for specialized caching hardware.

Figure 4:
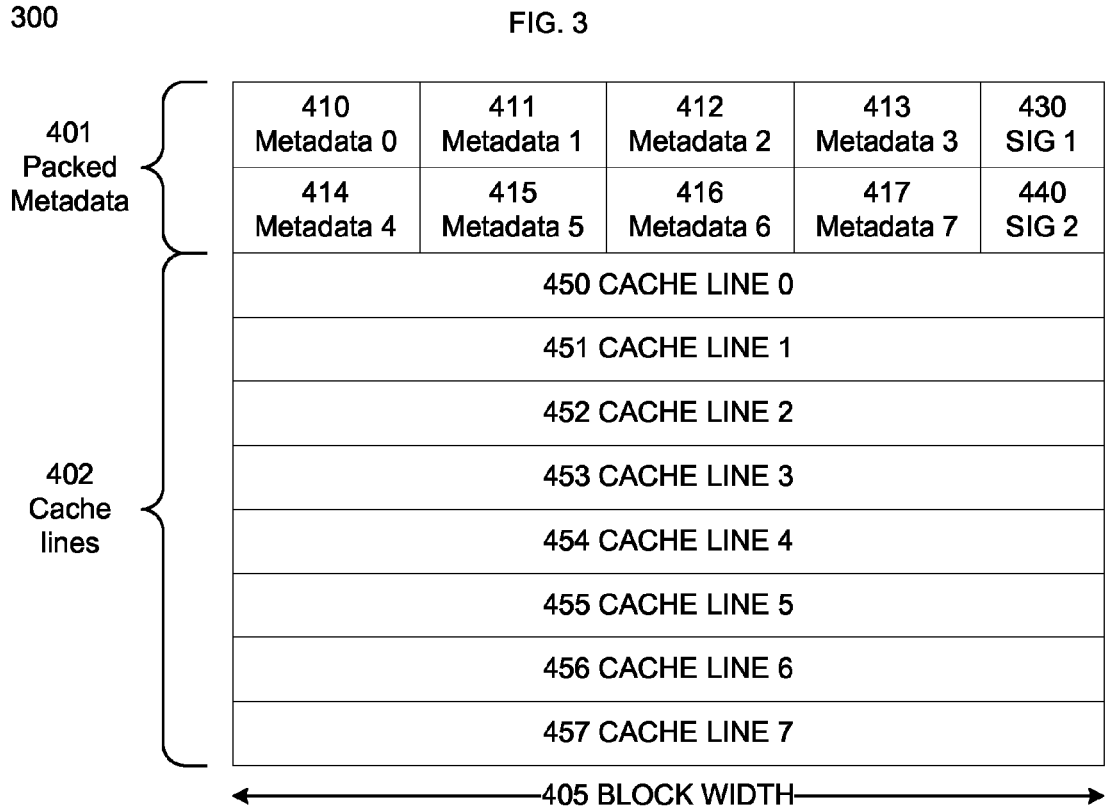
FIG. 4 illustrates a configuration of a caching device in accordance with one embodiment of the invention.

FIG. 4 illustrates a configuration 400 of a caching device 170 in accordance with one embodiment of the invention. The configuration 400 of the caching device 170 shows a logical segment of packed metadata 401 and another logical segment of cache lines 402. The block width 405 of the caching device 170 shows the data bit width of the caching device 170. In another embodiment of the invention, the configuration 400 of the caching device 170 may also include other logical segments (not shown in FIG. 4) that are used for other purposes such as data storage or data indexing.

By way of example, the logical segment of cache lines 402 is illustrated with eight cache lines (cache lines 0 to 7) that are used to cache the data of the storage device 160. The logical segment of cache lines 402 does not contain any metadata associated with any of the cache lines 402. One of ordinary skill in the relevant art will readily appreciate that the caching device 170 can have more than eight cache lines to cache the data of the storage device 160. In one embodiment of the invention, each cache line of the caching device 170 stores contiguous data of the storage device 160. In another embodiment of the invention, each cache line of caching device 170 does not store contiguous data of the storage device 160. The block width 405 is not limited to a particular bit width. In one embodiment of the invention, the block width 405 is the bus width of the communication link between the caching device and the run-time/recovery controller 344. For example, in one embodiment of the invention, if the bus width of the communication link between the caching device and the run-time/recovery controller 344 is 64 bits, the block width 405 can be set at a bit width that is a multiple of 64 bits. In another embodiment of the invention, the block width 405 is set to store a multiple of the LBAs of the storage device 160. For example, each cache line of the caching device is set to a block width 405 that can store four LBAs of the storage device 160.

The logical segment of packed metadata 401 has metadata 0 to 7 stored in a packed format such that multiple metadata, each associated with a different cache line, are stored adjacent to each other in one embodiment of the invention. For example, metadata 0 410 is associated with the cache line 0 450, metadata 1 411 is associated with the cache line 1 451 and so forth. In one embodiment of the invention, the packed metadata 401 has an integrity signature for each block of metadata. The metadata 0 to 3 410, 411, 412 and 413 has an integrity signature 1 430 and the metadata 4 to 7 414, 415, 416 and 417 has an integrity signature 2 440. The integrity signatures 430 and 440 protect against corrupt data structures due to an unexpected shutdown of system 100 or due to a failure event. The logical segment of packed metadata 401 is located contiguously in the caching device 170 to allow faster access of the packed metadata 401 in one embodiment of the invention. In another embodiment of the invention, the logical segment of packed metadata 401 is not located contiguously in the caching device 170. In yet another embodiment, the integrity signatures 430 and 440 are not stored in the logical segment of packed metadata 401.

To facilitate write-back or write-through caching in the caching device 170, the OS maintains information of the cache lines in the volatile memory 142 in one embodiment of the invention. The information of the cache lines includes, but is not limited to, a list of cache lines that are unused or do not hold any data of the storage device 160, a cache table that has link information between the data or LBA in the storage device 160 and the cache lines in the caching device 170 that stores the data or LBA, metadata of all the cache lines in the caching device 170 that can be stored in packed format or a different format, a list of cache lines for which their respective metadata in the volatile memory 142 has yet to be written to the metadata in the caching device 170 and the like. In one embodiment of the invention, the OS maintains a copy of the logical segment of packed metadata 401 of the caching device 170 in the volatile memory 142 to facilitate write-back or write-through caching in the caching device 170. In one embodiment of the invention, the cache table can be implemented as a hash table, a tree or any other search data structure.

Figure 5:
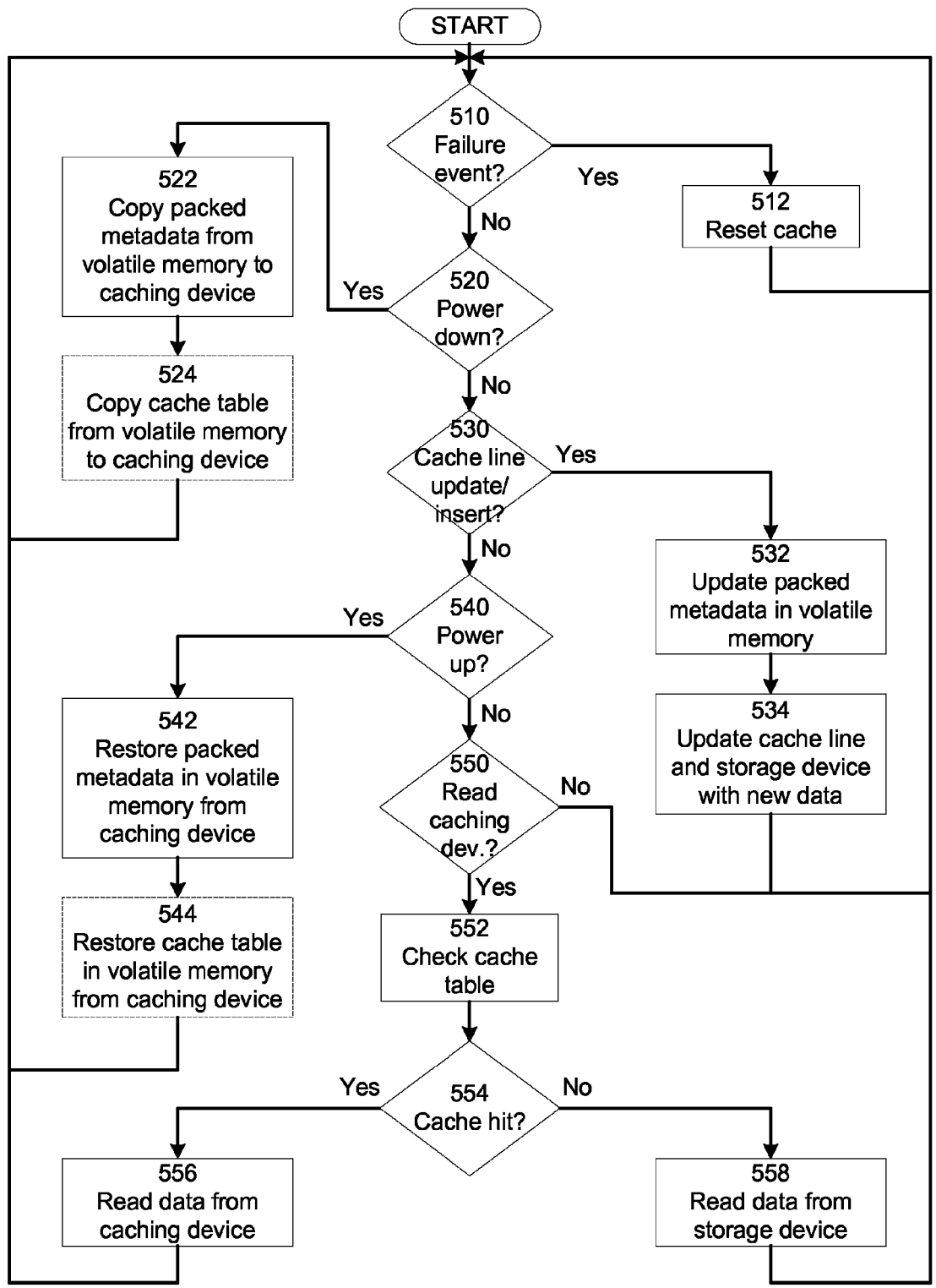
FIG. 5 illustrates a flow chart of a write-through caching scheme in accordance with one embodiment of the invention.

FIG. 5 illustrates a flow chart 500 of a write-through caching scheme in accordance with one embodiment of the invention. In step 510, the run-time controller checks if a failure event has occurred. In one embodiment of the invention, the run-time controller checks a register or flag that indicates if a failure event has occurred. In one embodiment of the invention, step 510 checks if the system 100 is improperly powered down. In another embodiment of the invention, step 510 checks if the OS has crashed or malfunctioned. If there is a failure event, the run-time controller resets the caching device 170 in step 512.

The flow goes back to step 510 after resetting the caching device 170 in step 512. In one embodiment of the invention, the run-time controller resets the caching device 170 by adding all cache lines of the caching device 170 to a list of spare or unused cache lines. The list of spare cache lines indicates to the run-time controller that the cache lines in the list are available to cache the data of the storage device 160. In another embodiment of the invention, the run-time controller resets the caching device 170 by tagging or marking the all cache lines of the caching device 170 as unused.

If there is no failure event, the run-time controller checks if there is a request to power down the system 100 properly in step 520. A proper power down or shutdown of the system 100 refers to an event where the OS issues a command to the system 100 including, but not limited to, a restart command, a shutdown command, a hibernate command, a standby command, or any command that powers down the system 100. If there is a request to power down the system 100 properly, the run-time controller copies the packed metadata associated with all the cache lines of the caching device 170 from the volatile memory 142 to the caching device 170 in step 522. In one embodiment of the invention, run-time controller copies the packed metadata associated with all the cache lines of the caching device 170 from the volatile memory 142 to the logical segment of packed metadata 401. In optional step 524, the run-time controller copies the cache table from the volatile memory 142 to the caching device 170 and the flow 500 goes back to step 510.

If there is no request to power down the system 100 properly, the run-time controller checks if there is a request to update or insert data in the cache line(s) of the caching device 170 in step 530. For example, in one embodiment of the invention, when the OS wants to write data to a particular address location in the storage device 160, the run-time controller checks the cache table if the data at the particular address location in the storage device 160 is cached in the caching device 170. If there is a cache hit, i.e., the data at the particular address location is cached in the caching device 170, the run-time controller receives a request to update the matching cache line(s) that stores the data of the particular address location. If there is a cache miss, i.e., the data at the particular address location is not cached in the caching device 170, the run-time controller receives a request to insert the data of the particular address location into the cache line(s) of the caching device 170.

If there is a request to update or insert data in the cache line(s) of the caching device 170, the run-time controller updates the packed metadata or state information associated with the cache line(s), based on the new data to be written, in the volatile memory 142 in step 532. In step 534, the run-time controller updates the cache line(s) and the storage device 160 with the new data. The data in the caching device 170 and the storage device 160 are synchronized when step 534 is completed.

If there is no request to update or insert data in the cache line(s) of the caching device 170, the recovery controller checks if there is any power up notification of the system 100 in step 540. If yes, the recovery controller restores or copies the packed metadata in the caching device 170 into the volatile memory 142 in step 542. In optional step 544, the recovery controller restores or copies the cache table in the caching device 170 to the volatile memory 142 if the cache table has been saved in a prior shutdown of the system 100 and the flow 500 goes back to step 510.

If no, the run-time controller checks if there is a request to read the data from the caching device 170 in step 550. For example, in one embodiment of the invention, when the OS wants to read data from a particular address location in the storage device 160, the run-time controller receives a request to read data from the caching device 170. If there is a request to read the data from the caching device 170, the run-time controller checks the cache table if the data at the particular address location in the storage device 160 is cached in the caching device 170 in step 552. If there is no request to read the data from the caching device 170, the flow goes back to step 510.

In step 554, the run-time controller checks if there is a cache hit, i.e., the data at the particular address location in the storage device 160 is cached in the caching device 170. If yes, the run-time controller reads the data from the caching device 170 and returns the data to the OS in step 556 and the flow 500 goes back to step 510. If no, the run-time controller sends a cache miss to the OS in step 558. In one embodiment of the invention, the run-time controller accesses the data at the particular address location in the storage device 160 when there is a cache miss and returns the data to the OS in step 558 and the flow 500 goes back to step 510.

In one embodiment of the invention, the run-time controller does not write or update the packed metadata in the caching device 170 during run-time when a write-through caching scheme is utilized. Since the data in the storage device 160 and caching device 170 is always synchronized, the caching device 170 can be reset when a failure event such as a power loss event occurs. The system 100 is power fail-safe as the integrity of the data in the storage device 160 is maintained even during a power loss event.

Figure 6A:
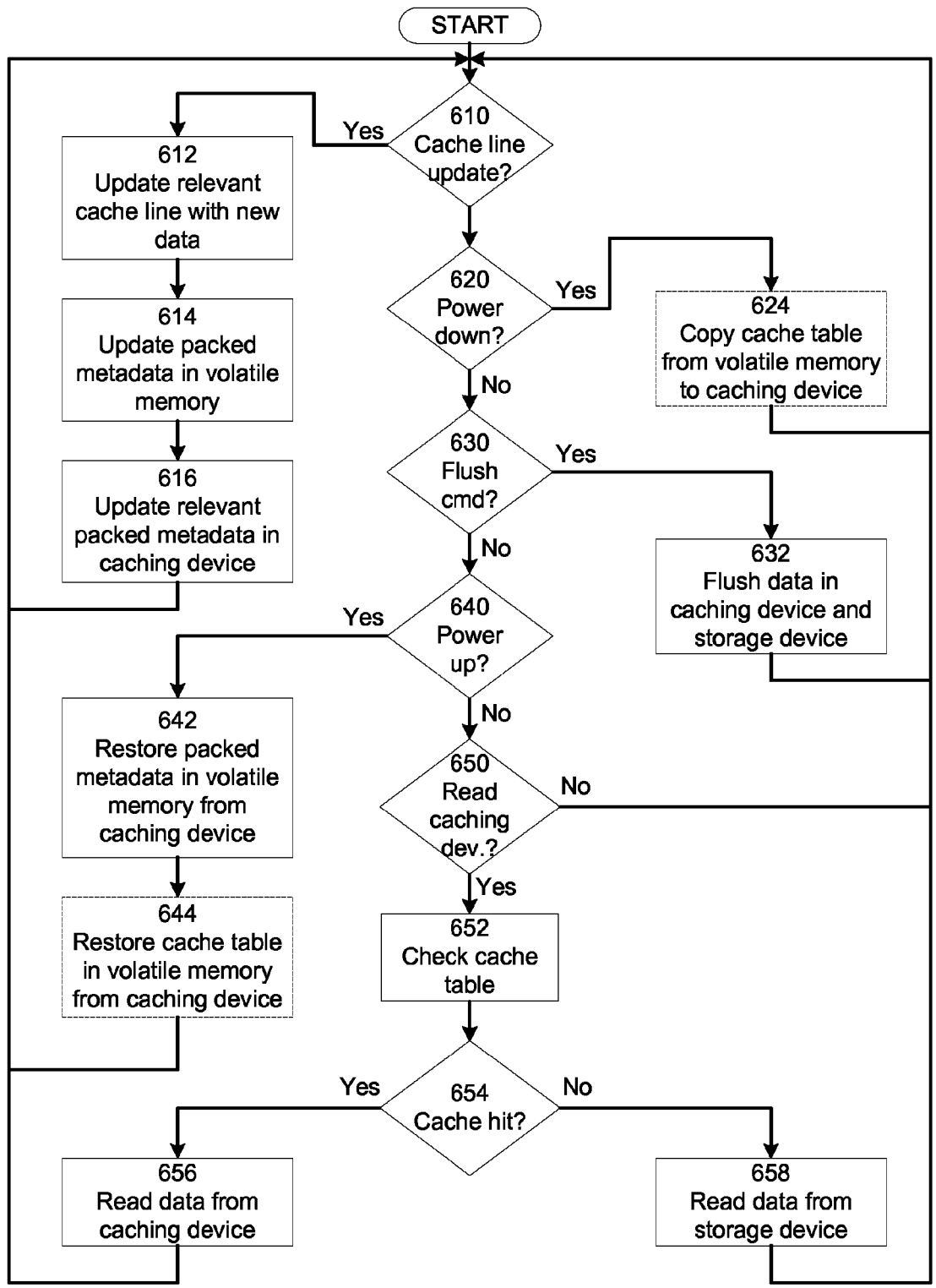
FIG. 6A illustrates a flow chart of a write-back caching scheme in accordance with one embodiment of the invention.

FIG. 6A illustrates a flow chart 600 of a write-back caching scheme in accordance with one embodiment of the invention. In step 610, the run-time controller checks if there is a request to update a cache line(s) of the caching device 170. If there is a request to update the cache line(s), the run-time controller updates the relevant cache line(s) with the new data in step 612. In step 614, the run-time controller updates the packed metadata or state information associated with the cache line(s), based on the new data to be written, in the volatile memory 142. In step 616, the run-time controller updates the packed metadata or state information associated with the cache line(s), based on the new data to be written, in the caching device 170. In another embodiment of the invention, the run-time controller copies the packed metadata or state information associated with the cache lines(s) in the volatile memory 142 into the relevant packed metadata associated with the cache line(s) in the logical segment of packet metadata 401 of the caching device 170 in step 616. The flow 600 goes back to step 610 after step 616 is completed.

If there is no request to update the cache line(s), the run-time controller checks if there is a request to power down the system 100 properly in step 620. If there is a request to power down the system 100 properly, the run-time controller copies the cache table from the volatile memory 142 to the caching device 170 in optional step 624, and the flow 600 goes back to step 610. If there is no request to power down the system 100 properly, the run-time controller checks if the OS has issued a flush command in step 630. If the OS has issued a flush command, the run-time controller flushes any volatile data in both the storage device 160 and the caching device 170 in step 632.

If the OS has not issued a flush command, the recovery controller checks if there is any power up notification of the system 100 in step 640. If yes, the recovery controller restores or copies the packed metadata in the caching device 170 into the volatile memory 142 in step 642. In optional step 644, the recovery controller restores or copies the cache table in the caching device 170 to the volatile memory 142 if the cache table has been saved in a prior shutdown of the system 100 and the flow 600 goes back to step 610.

If no, the run-time controller checks if there is a request to read the data from the caching device 170 in step 650. If there is a request to read the data from the caching device 170, the run-time controller checks the cache table if the data at the particular address location in the storage device 160 is cached in the caching device 170 in step 652. If there is no request to read the data from the caching device 170, the flow goes back to step 610.

In step 654, the run-time controller checks if there is a cache hit, i.e., the data at the particular address location in the storage device 160 is cached in the caching device 170. If yes, the run-time controller reads the data from the caching device 170 and returns the data to the OS in step 656 and the flow 600 goes back to step 610. If no, the run-time controller sends a cache miss to the OS in step 658. In one embodiment of the invention, the run-time controller accesses the data at the particular address location in the storage device 160 when there is a cache miss and returns the data to the OS in step 658 and the flow 600 goes back to step 610. The write-back caching scheme of FIG. 6A requires an additional write to the caching device 170 to update the packed metadata associated with the cache line(s) for every cache line write for new data.

Figure 6B:
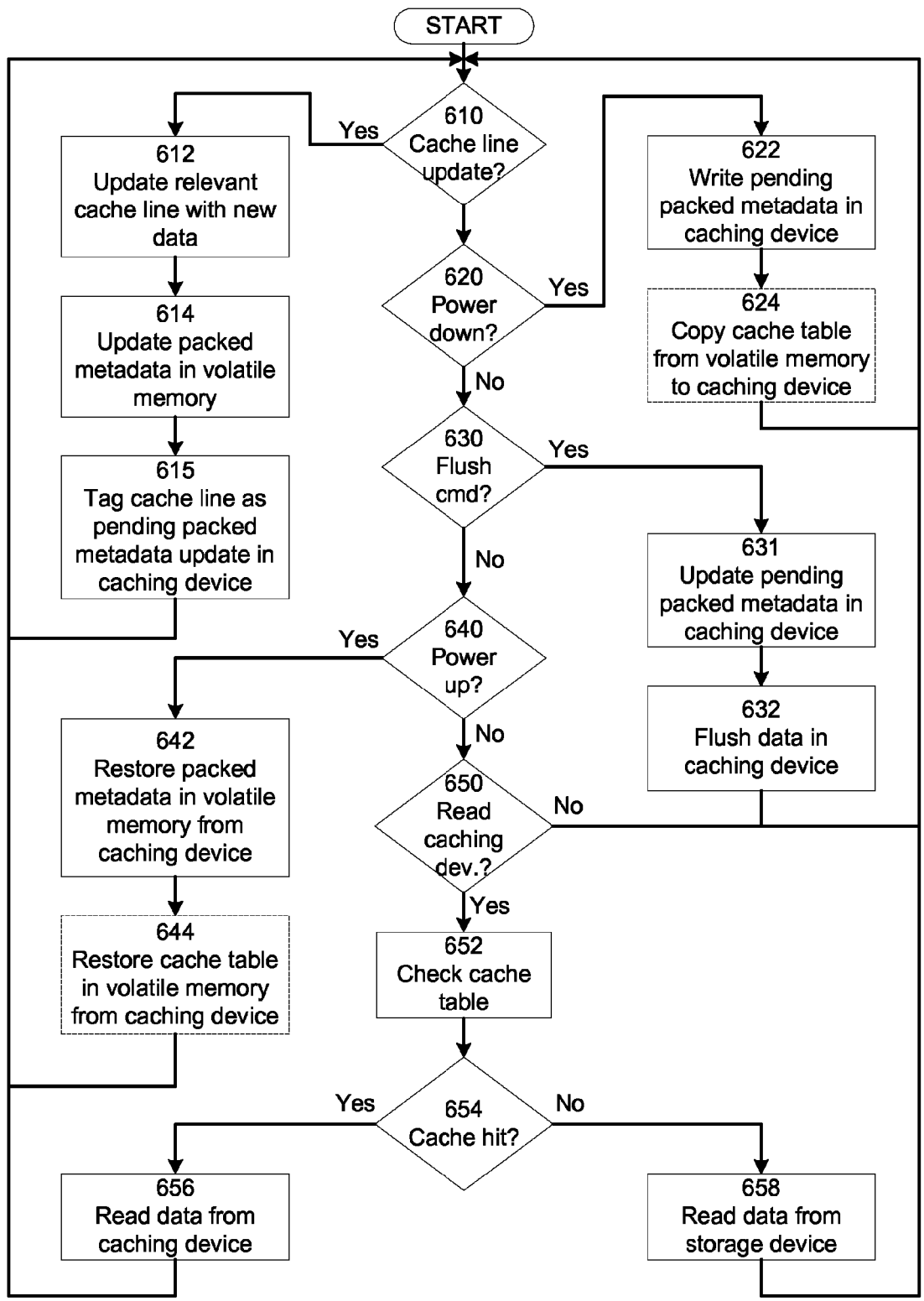
FIG. 6B illustrates a flow chart of a write-back caching scheme in accordance with one embodiment of the invention.

FIG. 6B illustrates a flow chart 660 of a write-back caching scheme in accordance with one embodiment of the invention. In step 610, the run-time controller checks if there is a request to update a cache line(s) of the caching device 170. If there is a request to update the cache line(s), the run-time controller updates the relevant cache line(s) with the new data in step 612. In step 614, the run-time controller updates the packed metadata or state information associated with the cache line(s), based on the new data to be written, in the volatile memory 142. In step 615, the run-time controller tags the cache line(s) as pending an update of the packed metadata associated with the cache lines, based on the new data, in the caching device 170. In one embodiment of the invention, the run-time controller tags the cache line(s) by adding the cache line(s) to a list in volatile memory 142 of pending metadata writes. The list of pending metadata writes includes cache line(s) that have associated packed metadata that is not synchronized between the volatile memory 142 and the caching device 170.

If there is no request to update the cache line(s), the run-time controller checks if there is a request to power down the system 100 properly in step 620. If there is a request to power down the system 100 properly, the run-time controller writes all pending packed metadata in the volatile memory 142 into the packed metadata in the caching device 170. In one embodiment of the invention, the run-time controller determines from the list of pending metadata writes which metadata is to be updated or written. In optional step 624, the run-time controller copies the cache table from the volatile memory 142 to the caching device 170, and the flow 660 goes back to step 610.

If there is no request to power down the system 100 properly, the run-time controller checks if the OS has issued a flush command in step 630. If there is a flush command issued, the run-time controller updates all pending packed metadata in the volatile memory 142 into the packed metadata in the caching device 170 in step 631. In another embodiment of the invention, the run-time controller updates or copies the entire packed metadata from the volatile memory 142 to the caching device 170 in a single sequential write operation in step 631. In step 632, the run-time controller flushes any volatile data in both the storage device 160 and the caching device 170.

If there is no flush command issued, the recovery controller checks if there is any power up notification of the system 100 in step 640. If yes, the recovery controller restores or copies the packed metadata in the caching device 170 into the volatile memory 142 in step 642. In optional step 644, the recovery controller restores or copies the cache table in the caching device 170 to the volatile memory 142 if the cache table has been saved in a prior shutdown of the system 100 and the flow 660 goes back to step 610.

If no, the run-time controller checks if there is a request to read the data from the caching device 170 in step 650. If there is a request to read the data from the caching device 170, the run-time controller checks the cache table if the data at the particular address location in the storage device 160 is cached in the caching device 170 in step 652. If there is no request to read the data from the caching device 170, the flow 660 goes back to step 610.

In step 654, the run-time controller checks if there is a cache hit, i.e., the data at the particular address location in the storage device 160 is cached in the caching device 170. If yes, the run-time controller reads the data from the caching device 170 and returns the data to the OS in step 656 and the flow 660 goes back to step 610. If no, the run-time controller sends a cache miss to the OS in step 658. In one embodiment of the invention, the run-time controller accesses the data at the particular address location in the storage device 160 when there is a cache miss and returns the data to the OS in step 658 and the flow 660 goes back to step 610. The write-back caching scheme of FIG. 6B requires an optional additional write to the caching device 170 to update the packed metadata associated with the cache line(s) for every flush or power-down event.

Figure 6C:
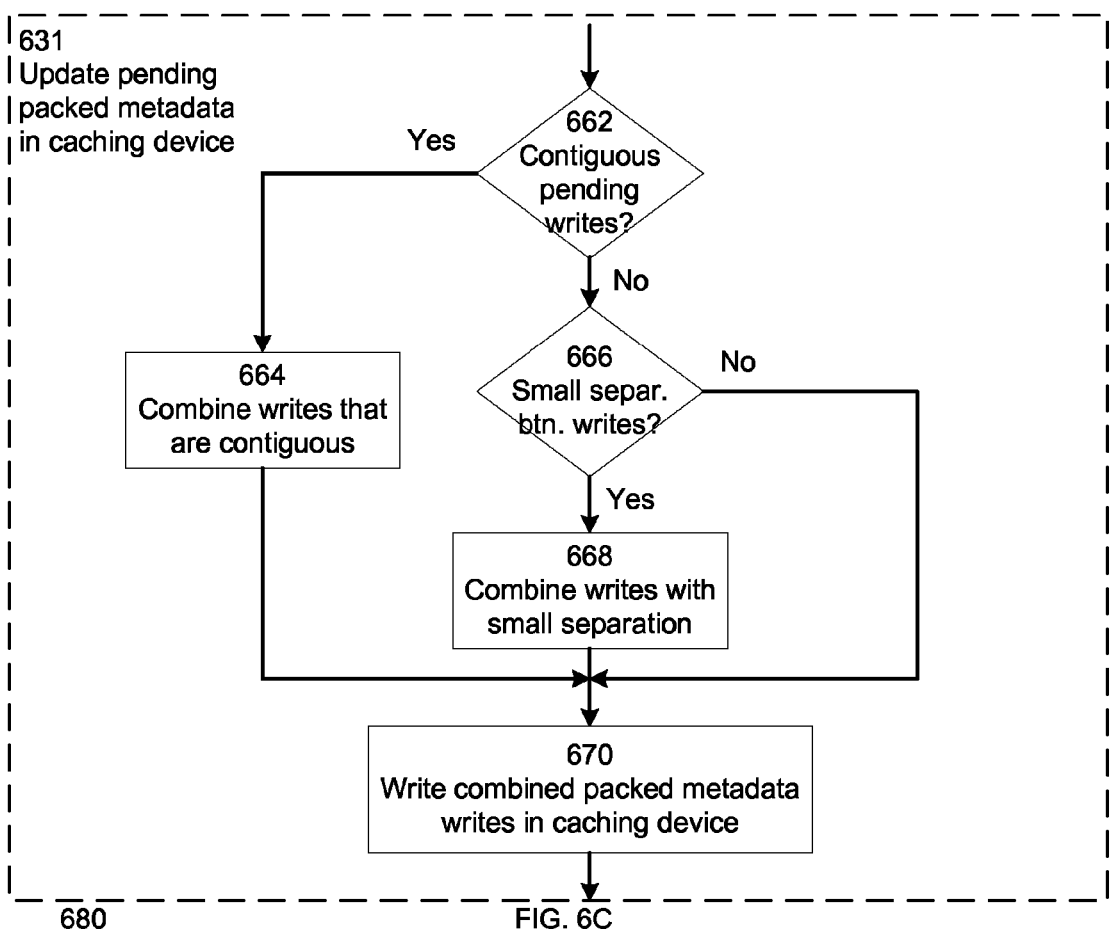
FIG. 6C illustrates a flow chart of a write-back caching scheme in accordance with one embodiment of the invention.

FIG. 6C illustrates a flow chart 680 of a write-back caching scheme in accordance with one embodiment of the invention. FIG. 6C is discussed with reference with FIG. 6B, as the flow 680 is a variation of the flow 660. All the steps in flow 660, except step 631 apply to flow 680 and these steps shall not be repeated herein. In flow 680, after receiving a flush command from the OS in step 630, the run-time controller checks if there are contiguous pending writes in the list of pending metadata writes in step 662. For illustrative purposes, the list of pending metadata writes is assumed to have pending metadata writes for seven cache lines (caches lines 5, 6, 7, 9, 12, 13, and 45).

In the assumed scenario, the flow 680 goes to step 664 as cache lines 5, 6 and 7 are contiguous and cache lines 12 and 13 are also contiguous. In step 664, the run-time controller combines the metadata writes for cache lines 5, 6 and 7 into a single metadata write. It also combines the metadata writes for cache lines 12, and 13 into another single metadata write. Therefore, the run-time controller has four metadata writes (combined write of 5, 6 and 7, 9, combined write of 12 and 13, and 45) instead of the original seven metadata writes. In step 670, the run-time controller performs the four metadata writes of step 664.

In another illustrative example, the list of pending metadata writes is assumed to have pending metadata writes for five cache lines (caches lines 3, 9, 11, 14, and 45). In the assumed scenario, the flow 680 goes to step 662 to check if there is small separation in the address location of the pending cache lines to be written. The separation between the cache lines is termed as small if the time taken to write the cache lines together is shorter than the time taken to write the cache lines separately in one embodiment of the invention. For example, if the time required to update the metadata associated with cache lines 9, 10, and 11 is shorter than the time required to update the metadata associated with cache lines 9, and 11 separately, the separation between cache lines 9 and 11 is considered as small. Even though the metadata associated with cache line 10 is not required to be updated, combining the metadata update of the cache lines reduces the time required to update the cache lines in one embodiment of the invention.

In the assumed scenario, the separation between cache lines 9 and 11 and between cache lines 11 and 14 is assumed small and the flow goes to step 668. In step 668, the run-time controller combines the cache lines with a small separation between them into a large metadata cache write. For example, in the assumed scenario, the run-time controller combines metadata update for cache lines 9, 11, and 14 into a single metadata update for cache lines 9-14, even though cache lines 10, 12 and 13 are not required to be modified. In step 670, the run-time controller performs the combined metadata writes of step 664 and the flow goes to step 634 in flow 660. The steps 664 and 668 optimize the operations to update the pending packed metadata in the caching device 170. In flow 680, in another embodiment of the invention, only one of steps 662 and 664, and steps 666 and 668 can performed. One of ordinary skill in the relevant art will readily appreciate that other optimizations can be performed to reduce the time to update the pending metadata updates in the caching device 170 without affecting the workings of the invention.

The write-back caching schemes illustrated in FIGS. 6A, 6B, and 6C are not meant to be limiting. One of ordinary skill in the relevant art will readily appreciate that various combination or modification of the steps may be performed without affecting the workings of the invention. An user of the system 100 can decide on one of the three write-back caching schemes of FIGS. 6A, 6B, and 6C to utilize and may also use any combination of the three write-back caching schemes of FIGS. 6A, 6B, and 6C.

Figure 7:
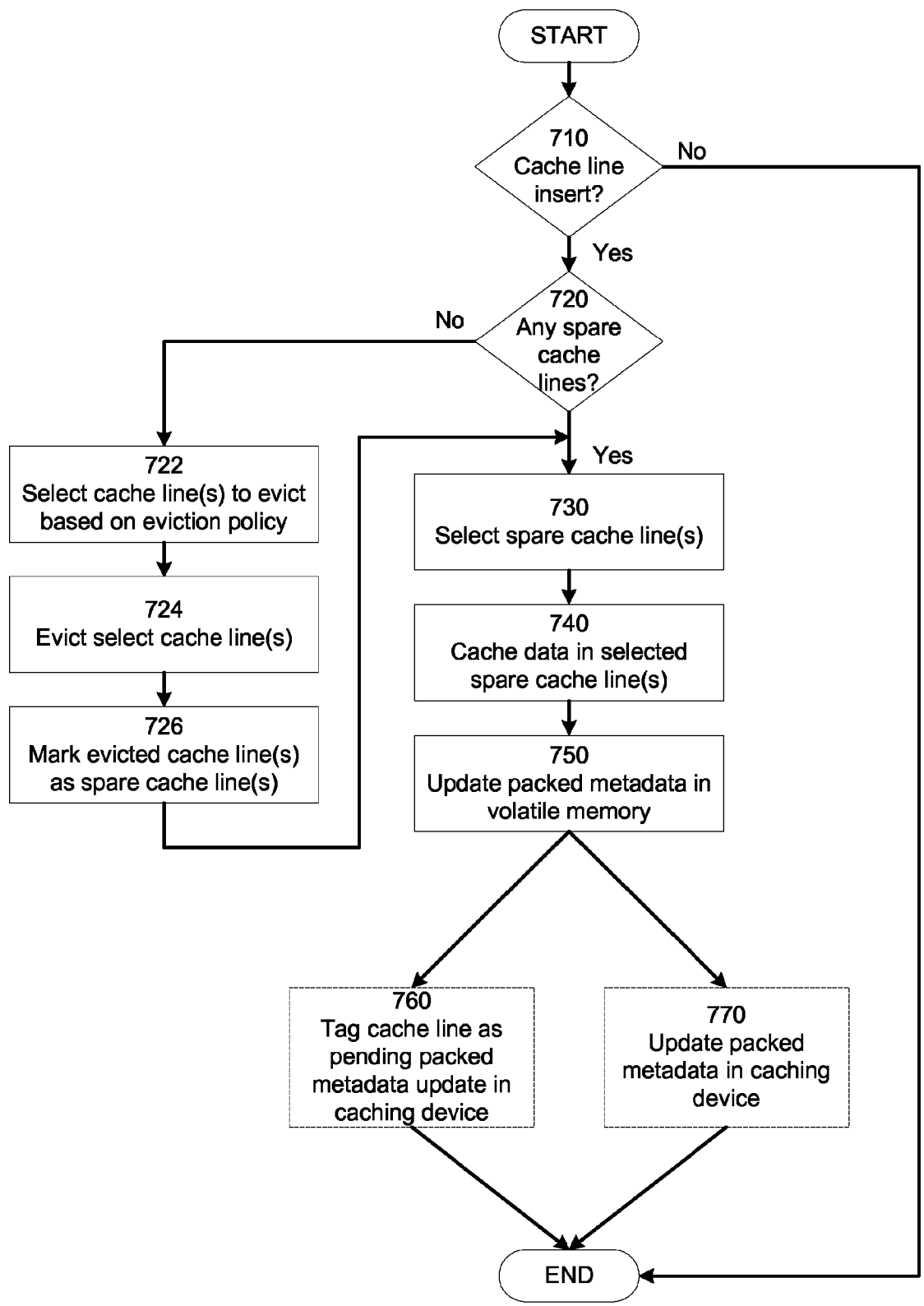
FIG. 7 illustrates a flow chart of a method to insert data into a cache line in accordance with one embodiment of the invention.

FIG. 7 illustrates a flow chart 700 of a method to insert data into a cache line of the caching device 170 in accordance with one embodiment of the invention. In step 710, the run-time controller checks if there is a request to insert data into the cache line(s) of the caching device 170. For example, in one embodiment of the invention, when the OS wants to write data to a particular address location in the storage device 160, the run-time controller checks the cache table if the data at the particular address location in the storage device 160 is cached in the caching device 170. If there is no cache hit, i.e., the data at the particular address location is not cached in the caching device 170, the run-time controller may receive a request to insert the data into the cache line(s) of the caching device 170.

If there is no request to insert data into the cache line(s), the flow ends. If there is a request to insert data into the cache line(s), the run-time controller checks if there are any spare cache lines in the caching device 170 in step 720. In one embodiment of the invention, all unused cache lines in the caching device 170 are tagged or marked as spare cache lines. In another embodiment of the invention, a fixed portion of the unused cache lines in the caching device 170 are tagged or marked as spare cache lines. For example, in one embodiment, the run-time controller can tag five cache lines of the caching device 170 as spare cache lines. If there are no spare cache lines, the run-time controller selects one or more cache lines of the caching device 170 to be evicted based on an eviction policy in step 722. The eviction policy includes, but is not limited to, evicting the least recently used cache line(s), evicting the first cache line of the caching device 170, or the like.

In step 724, the selected cache line(s) are evicted by the run-time controller. In one embodiment of the invention, the run-time controller evicts the selected cache line(s) by writing the cached data in the selected cache line(s) to the storage device 160 if it is not already synchronized. In step 726, the run-time controller marks or tags the evicted cache line(s) as spare cache line(s) and the flow goes to step 730. If there are spare cache line(s), the run-time controller selects one or more spare cache line(s) of the caching device 170 to cache the data to be written in step 730. The selection policy of the spare cache line(s) includes, but is not limited to, first available spare cache line, least recently used spare cache line and the like. In step 740, the run-time controller writes the data to the selected spare cache line(s).

In step 750, the run-time controller updates the packed metadata or state information associated with the selected cache line(s), based on the new data, in the volatile memory 142. After step 750, the flow 700 can perform an optional step 760, where the run-time controller tags the cache line(s) as pending an update of the packed metadata associated with the cache lines, based on the new data, in the caching device 170 if the write-back caching scheme of flow 660 or 680 is utilized, or perform an optional step 770, where the run-time controller updates the packed metadata or state information associated with the selected cache line(s), based on the new data, in the caching device 170 if the write-back caching scheme of flow 600 is utilized. The flow ends after either optional steps 760 or 770 is completed.

Evictions of cache line(s) require an immediate update of the packed metadata associated with the cache line(s) in the caching device 170 because a failure event such as a power failure of the system 100 may cause a data integrity problem in the storage device 160 and the caching device 170. As such, evictions of cache line(s) require a metadata write associated with the cache line(s) in the caching device 170 after each eviction. However, performing an additional metadata write after each eviction of the cache line(s) incurs overheads. To avoid the overheads, the method discussed in FIG. 7 of inserting data into a cache line(s) of the caching device 170 includes inserting new data into spare cache line(s) instead of a cache line(s) with cached data.

For example, for the purposes of illustration, the run-time controller is assumed to receive a request to insert data for LBA 1 of the storage device 160. Cache line 4 is assumed to store the data from LBA 5 of the storage device 160. If a failure event occurs after cache line 4 is written with the data from LBA 1 of the storage device 160 but before the metadata associated with cache line 4 is updated, the system 100 upon a restart or reboot event, will see that cache line 4 has the data from LBA 5 based on the metadata associated with cache line 4. However, this is erroneous, as the cache line 4 has been updated with the data from LBA 1 of the storage device 160.

By inserting new data into spare cache lines as described in the flow 700 of FIG. 7, a failure event that occurs does not affect the data integrity of the storage device 160 and caching device 170. For example, for the purposes of illustration, when the run-time controller receive a request to insert the data from LBA 1 of the storage device 160 into the caching device 170, the run-time selects a spare cache line to cache the data from LBA1 of the storage device 160. If a failure event occurs after the spare cache line is updated with the data from LBA 1 of the storage device 160 but before the metadata associated with the spare cache line is updated, the failure event does not affect the data integrity in the storage device 160 and the caching device 170. As it is a failure event and no flush event has occurred, the new data can be discarded without affecting the system 100.

The write-through caching scheme is not limited to the algorithm shown in FIG. 5. In another embodiment of the invention, the write-through caching scheme can utilize one of the write-back caching algorithms shown in FIGS. 6A, 6B and 6C. The write-back caching scheme can utilize one of the write-back caching algorithms shown in FIGS. 6A, 6B and 6C and the algorithms shown in FIG. 7. If the write-through caching scheme utilizes one of the write-back caching algorithms shown in FIGS. 6A, 6B and 6C and the algorithms shown in FIG. 7, the write-through cache can be kept warm across improper shutdowns as well.

FIGS. 8A and 8B illustrate a pseudo code 800 and 850 to implement a write-back caching scheme in accordance with one embodiment of the invention. For the purposes of illustration, a HDD is used to exemplify the storage device 160 and a SSD is used to exemplify the caching device 170. One of ordinary skill in the relevant art will readily appreciate the workings of the pseudo code 800 and 850 and the workings of the pseudo code 800 and 850 shall be not discussed in detail.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

The invention claimed is:

1. A method comprising:
    caching data of a first device into one or more of a plurality of cache lines of a second device, wherein no state information associated with any of the cache lines is to be stored atomically with the data in the second device during caching of the data, wherein caching the data of the first device into the one or more cache lines of the second device comprises:
    determining from state information associated with the plurality of cache lines if any of the plurality of cache lines is tagged as unused;
    if not,
        evicting at least one of the plurality of cache lines; and
        tagging the at least one evicted cache line as unused in the state information;
    selecting one or more cache lines tagged as unused in the state information; and
    caching the data of the first device into the selected one or more cache lines.

2. The method of claim 1, further comprising storing state information associated with one or more of the cache lines in a memory when the data of the first device is cached into the one or more cache lines of the second device.

3. The method of claim 2, further comprising:
    updating the cached data in the one or more cache lines with new data when the new data is to be written to the one or more cache lines; and
    updating the state information associated with the one or more cache lines based on the new data in the memory.

4. The method of claim 3, further comprising:
    copying all state information in the memory to the second device when one of a restart, shutdown, hibernate, or standby, command is received.

5. The method of claim 3, further comprising resetting the second device when a power or system failure has occurred.

6. The method of claim 3, wherein the second device comprises a copy of the state information associated with the one or more cache lines in the memory, further comprising updating the state information associated with the one or more cache lines based on the new data in the copy of the state information in the second device responsive to updating the cached data.

7. The method of claim 3, wherein the second device comprises a copy of the state information associated with the one or more cache lines in the memory, further comprising tagging the one or more cache lines as pending an update of the state information associated with the one or more cache lines based on the new data in the copy of the state information in the second device responsive to updating the cached data.

8. The method of claim 7, further comprising updating the state information associated with the one or more tagged cache lines in the copy of the state information in the second device when one of a flush, restart, shutdown, hibernate, or standby, command is received.

9. The method of claim 3, further comprising copying the state information associated with the one or more cache lines in the memory to the second device when a flush command is received.

10. The method of claim 9, wherein copying the state information associated with the one or more cache lines in the memory to the second device comprises optimizing number of copy operations.

11. An apparatus comprising:
a NAND flash memory having a first logical segment of a plurality of cache lines and a second logical segment of a plurality of cache lines, metadata associated with a respective one of the plurality of cache lines, wherein the second logical segment does not have any metadata, wherein the plurality of cache lines comprises a plurality of spare cache lines, and wherein the controller is further to:
determine if all the spare cache lines are used
if so,
evict one or more selected cache lines, the selection based on an eviction policy;
add the evicted one or more selected cache lines to the spare cache lines; and wherein the controller to cache the data of the storage device in the one or more cache lines is to cache the data of the storage device in the one or more spare cache lines; and
a controller to cache data of a storage device into one or more cache lines.

12. The apparatus of claim 11, wherein each metadata of the second logical segment comprises at least one of a sequence number, a logical block address, a state information, and pinning information of cached data in its associated respective cache line.

13. The apparatus of claim 12, wherein the controller is further to overwrite the metadata in the non-volatile media with the metadata in the memory when a flush command issued by an operating system (OS) executing on the system is received.

14. The apparatus of claim 11, further comprising a memory to store the plurality of metadata, and wherein the controller is further to:
update the cached data of the one or more cache lines with new data when the new data is to be written to the one or more cache lines; and
update the metadata associated with the one or more cache lines based on new data in the memory.

15. The apparatus of claim 14, wherein the controller is further to:
update the storage device with the new data; and
overwrite the metadata associated with the one or more cache lines in the NAND flash memory with the metadata associated with the one or more cache lines in the memory when the apparatus is to be rebooted, shut down, or placed in a sleeping state.

16. The apparatus of claim 14, wherein the memory is further to store a cache table comprising link information between the data in the storage device and the plurality of cache lines and wherein the controller is further to copy the cache table in the memory to the NAND flash memory when the apparatus is to be rebooted, flushed, shut down, or placed in a sleeping state.

17. The apparatus of claim 16, wherein the controller is further to copy the cache table from the NAND flash memory to the memory when the apparatus is to be powered up or restarted.

18. The apparatus of claim 14, wherein the controller is to update the metadata associated with the one or more cache lines based on the new data in the NAND flash memory when the new data is to be written to the one or more cache lines, responsive to updating the cached data.

19. The apparatus of claim 14, wherein the controller is further to add the one or more cache lines to a list, and wherein the list is to indicate that the metadata associated with the one or more cache lines in the NAND flash memory is pending to be updated with the metadata associated with the one or more cache lines in the memory.

20. The apparatus of claim 19, wherein the controller is further to update the metadata associated with the one or more cache lines in the NAND flash memory with the metadata associated with the one or more cache lines in the memory when the apparatus is to be powered off or rebooted, or when the NAND flash memory is to be flushed.

21. The apparatus of claim 20, wherein the controller is further to restore the metadata in the memory with the metadata in the NAND flash memory when the apparatus is to be powered up or restarted.

22. The apparatus of claim 11, wherein the storage device is one of a hard disk, a tape drive, a compact disc, a zip disk, a flash memory, and a solid-state drive.

23. The apparatus of claim 11, wherein the controller is a block storage driver.

24. A computer readable storage medium having instructions stored thereon which, when executed, cause a processor to perform the following method:
write-back or write-through caching of data of a storage device into one or more of a plurality of cache lines of a caching device, wherein no metadata associated with any of the cache lines is to be written atomically into the caching device when the data is cached, wherein write-back or write-through caching of the data of the storage device into the one or more cache lines of the caching device comprises:
determining if any of the plurality of cache lines is tagged as unused;
if not,
evicting at least one of the plurality of cache lines; and
tagging the at least one evicted cache line as unused;
selecting one or more cache lines tagged as unused; and
caching the data of the storage device into the selected one or more cache lines.

25. The medium of claim 24, wherein write-through caching of the data comprises:
determining that the one or more cache lines of the caching device is to be updated with new data;
updating the one or more determined cache lines with the new data;
updating metadata associated with the one or more determined caches lines based at least on the new data in a memory; and
updating the storage device with the new data.

26. The medium of claim 24, wherein write-back caching of the data comprises:
determining that the one or more cache lines of the caching device is to be updated with new data;
updating metadata associated with the one or more determined caches lines based at least on the new data in a memory;
updating the one or more determined cache lines with the new data; and
marking the one or more determined caches lines, wherein the marking is to indicate that metadata associated with the one or more determined caches lines in the caching device is to be updated with the metadata associated with the one or more determined caches lines in the memory.

27. The medium of claim 24, wherein write-back caching of the data further comprises:

updating the metadata associated with the one or more determined caches lines in the caching device with the metadata associated with the one or more determined caches lines in the memory when a power down, a reboot or a flush command is received.

28. An system comprising:
a NAND flash memory having a first logical segment of a plurality of cache lines and a second logical segment of a plurality of metadata, each metadata associated with a respective one of the plurality of cache lines, wherein the second logical segment does not have any metadata, wherein the plurality of cache lines comprises a plurality of spare cache lines, and wherein the controller is further to:
determine if all the spare cache lines are used
if so,
  evict one or more selected cache lines, the selection based on an eviction policy;
  add the evicted one or more selected cache lines to the spare cache lines; and wherein the controller to cache the data of the storage device in the one or more cache lines is to cache the data of the storage device in the one or more spare cache lines; and
a memory controller to write-back or write-through cache data of a storage medium in one or more cache lines of the first logical segment of the NAND flash memory, wherein no metadata is to be written atomically into the first logical segment when the data is cached.

29. The system of claim 28, wherein each metadata of the second logical segment comprises at least one of a sequence number, a logical block address, a state information, and pinning information of cached data in its associated respective cache line.

* * * * *